(12) United States Patent
Meng et al.

(10) Patent No.: US 11,568,092 B2
(45) Date of Patent: Jan. 31, 2023

(54) METHOD OF DYNAMICALLY CONFIGURING FPGA AND NETWORK SECURITY DEVICE

(71) Applicant: Hangzhou DPtech Technologies Co., Ltd., Zhejiang Province (CN)

(72) Inventors: Xiangyu Meng, Zhejiang (CN); Daisheng Zhang, Zhejiang (CN)

(73) Assignee: Hangzhou DPtech Technologies Co., Ltd., Zhejiang Province (CN)

( * ) Notice: Subject to any disclaimer, the term of this patent is extended or adjusted under 35 U.S.C. 154(b) by 568 days.

(21) Appl. No.: 16/727,058

(22) Filed: Dec. 26, 2019

(65) Prior Publication Data
US 2020/0334384 A1 Oct. 22, 2020

(30) Foreign Application Priority Data

Apr. 22, 2019 (CN) .......................... 201910325443.0

(51) Int. Cl.
*G06F 21/76* (2013.01)
*G06F 9/54* (2006.01)
(Continued)

(52) U.S. Cl.
CPC .............. *G06F 21/76* (2013.01); *G06F 9/542* (2013.01); *G06F 9/546* (2013.01);
(Continued)

(58) Field of Classification Search
CPC .......... G06F 21/76; G06F 21/44; G06F 9/542; G06F 9/546; G06F 12/1081; H03K 19/1737; H03K 19/17752; H04L 12/18
See application file for complete search history.

(56) References Cited

U.S. PATENT DOCUMENTS 8,891,405 B2 11/2014 Kamble et al.
2004/0085972 A1 5/2004 Warren et al.
2018/0287964 A1* 10/2018 Gray .................. H04L 12/18

FOREIGN PATENT DOCUMENTS

CN 101183977 A 5/2008
CN 101783812 A 7/2010
(Continued)

OTHER PUBLICATIONS

State Intellectual Property Office of the People's Republic of China, Office Action and Search Report Issued in Application No. 201910325443.0, dated Sep. 1, 2021, 8 pages.
(Continued)

*Primary Examiner* — Ernest Unelus
(74) *Attorney, Agent, or Firm* — Greenblum & Bernstein, P.L.C.

(57) ABSTRACT

Provided are a method of dynamically configuring a FPGA and a network security device. The network security device includes a CPU and at least one FPGA coupled with the CPU. The CPU generates a configuration entry for a target FPGA in response to a user instruction. The configuration entry includes a classification number and a configuration content for the target FPGA. The CPU sends the configuration entry to each FPGA coupled with the CPU, Each FPGA obtains its own classification number, compares its own classification number with the classification number in the configuration entry, and stores the configuration content when the own classification number the same with the classification number in the configuration entry.

18 Claims, 3 Drawing Sheets

(51) Int. Cl.
*G06F 12/1081* (2016.01)
*G06F 21/44* (2013.01)
*H03K 19/173* (2006.01)
*H03K 19/17752* (2020.01)

(52) U.S. Cl.
CPC .......... *G06F 12/1081* (2013.01); *G06F 21/44* (2013.01); *H03K 19/1737* (2013.01); *H03K 19/17752* (2013.01)

(56) References Cited

FOREIGN PATENT DOCUMENTS

| CN | 108055202 A | 5/2018 |
| CN | 108696390 A | 10/2018 |
| CN | 109033008 A | 12/2018 |
| CN | 109144932 A | 1/2019 |
| CN | 109194512 A | 1/2019 |
| CN | 109344115 A | 2/2019 |

OTHER PUBLICATIONS

State Intellectual Property Office of the People's Republic of China, Office Action and Search Report Issued in Application No. 2019103254430, dated Jan. 29, 2021, 22 pages.

* cited by examiner

METHOD OF DYNAMICALLY CONFIGURING FPGA AND NETWORK SECURITY DEVICE

CROSS REFERENCE TO RELATED APPLICATIONS

This application claims priority to Chinese Patent Application No. 201910325443.0 and filed on Apr. 22, 2019, the entire content of which is incorporated herein by reference.

TECHNICAL FIELD

The present disclosure relates to network security technology and in particular, to a method of dynamically configuring a Field Programmable Gate Array (FPGA) and a network security device.

BACKGROUND

Along with development of information technology, users may accept different types of network information services through a network. Network technology also provides a space for network attacks while providing conveniences for users. Some environments with a relatively large network traffic, for example, data centers of enterprises, are more vulnerable to network attacks. Therefore, a large-scale data center is usually deployed with a plurality of security products and services such as firewalls, and load balancers.

SUMMARY

In view of this, the present disclosure provides a method of dynamically configuring a FPGA and a network security device.

According to a first aspect of examples of the present disclosure, a method of dynamically configuring a FPGA is provided. The method is applicable to a network security device, where the network security device includes a CPU and at least one FPGA coupled with the CPU, and the method includes: in response to a user instruction, generating, by the CPU, a configuration entry for a target FPGA, where the configuration entry comprises a classification number and a configuration content for the target FPGA; sending, by the CPU, the configuration entry to each of the at least one FPGA coupled with the CPU; and for each of the at least one FPGA, obtaining, by the FPGA, a classification number of the FPGA, comparing, by the FPGA, the classification number of the FPGA with the classification number in the configuration entry, and storing, by the FPGA, the configuration content when the classification number of the FPGA is the same as the classification number in the configuration entry.

According to a second aspect of examples of the present disclosure, a network security device is provided. The network security device includes: a CPU and at least one FPGA coupled with the CPU. The CPU is configured to: in response to a user instruction, generate a configuration entry for a target FPGA, wherein the configuration entry comprises a classification number and a configuration content for the target FPGA, and send the configuration entry to each of the at least one FPGA coupled with the CPU.

For each of the at least one FPGA coupled with the CPU, the FPGA is configured to: obtain a classification number of the FPGA, compare the classification number of the FPGA with the classification number in the configuration entry, and store the configuration content when the classification number of the FPGA is the same as the classification number in the configuration entry.

DETAILED DESCRIPTION

Figure 1:
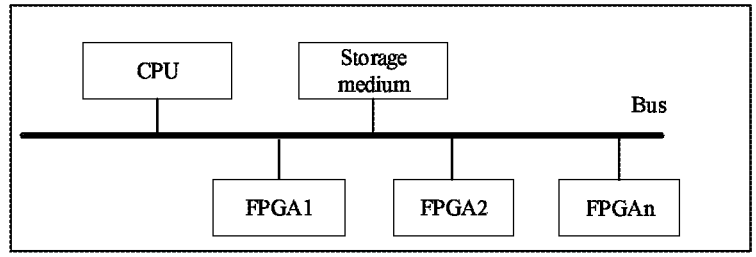
FIG. 1 is an architecture diagram of a network security device according to an example of the present disclosure.

Examples will be described in detail herein with the examples thereof expressed in the drawings. When the following descriptions involve the drawings, like numerals in different drawings represent like or similar elements unless stated otherwise. The implementations described in the following example embodiments do not represent all implementations consistent with the present disclosure. On the contrary, they are merely examples of a device and a method consistent with some aspects of the present disclosure described in detail in the appended claims.

The terms used herein are used for the purpose of describing a particular example only rather than limiting. The singular forms such as "a", "said", and "the" used in the present disclosure and the appended claims are also intended to include multiple, unless the context clearly indicates otherwise. It is also to be understood that the term "and/or" as used herein refers to any or all possible combinations that include one or more associated listed items. It is noted that depending on the context, the word "if" as used herein may be interpreted as "when" or "as" or "determining in response to".

To prevent network attacks, a large-scale data center may be deployed with a plurality of network security products and services such as firewalls, and load balancers. In some examples, a heterogeneous architecture between Central Processing Unit (CPU) and FPGA is a common architecture of network security products. This heterogeneous architecture fully utilizes features of FPGA such as programmability, high throughput rate and low latency, so that CPU generates relevant configuration entries by compiling to dynamically configure FPGA, thereby realizing different security service functions.

FIG. 1 is an architecture diagram of a network security device according to an example of the present disclosure.

As shown in FIG. 1, a network security device includes a heterogeneous architecture between CPU and FPGAs.

Under the architecture, the CPU of the network security device may be coupled with at least one FPGA. A user may dynamically configure a target FPGA coupled with the CPU by editing a configuration instruction.

The quantity of FPGAs coupled with the CPU is not limited in the present disclosure and may be determined according to actual performance requirements of the network security device.

After receiving the configuration instruction edited by the user, the CPU may compile a configuration entry for the target FPGA based on the configuration instruction. The compiled configuration entry includes an entry address and a configuration content. It is noted that the entry address in the configuration entry refers to a storage address where the FPGA stores the configuration entry.

For the compiled configuration entry, the CPU may determine a physical position of a target FPGA by performing, based on the entry address in the configuration entry, addressing for the target FPGA, and distribute the compiled configuration entry to the target FPGA.

For example, during an implementation, the CPU and the FPGAs may be coupled through a Peripheral Component Interconnect (PCI) bus. The CPU may pre-maintain an address table corresponding to the FPGAs in a PCI register corresponding to the PCI bus and determine the physical position of the target FPGA by querying the entry address of the configuration entry in the address table.

According to the above technical solution, on one hand, since the CPU performs addressing for the target FPGA based on the entry address in the configuration entry, channel bandwidths between the CPU and the FPGAs may be occupied. Therefore, the efficiency at which the CPU configures the FPGA is relatively low and the performance of the CPU may also be affected. On the other hand, if a user needs to dynamically configure a plurality of FPGAs, the CPU needs to respectively compile a configuration entry for each FPGA, resulting in a large amount of computation of the CPU. Further, when an update frequency of the configuration entry is relatively high, the generation of these entries will occupy more CPU resources, thereby decreasing the performance of the entire system.

Based on this, the present disclosure provides a method of dynamically configuring a FPGA, in which the CPU does not perform addressing for the FPGA but the FPGA autonomously receives the configuration entry distributed by the CPU.

During an implementation, each FPGA obtains its own classification number, compares its own classification number with the classification number in the configuration entry, and stores the configuration content when its own classification number is the same as the classification number in the configuration entry.

It can be known from the above technical solution that the CPU adds the classification number in the generated configuration entry and distributes the configuration entry to each FPGA so that each FPGA may compare its own classification number with the classification number in the configuration entry. When a classification number of a FPGA is the same as the classification number in the configuration entry, the FPGA receives the configuration entry, thereby realizing configuration of the target FPGA.

On one hand, when distributing the configuration entry to the target FPGA, the CPU does not perform addressing for the target FPGA based on the entry address in the configuration entry, but directly distributes the configuration entry carrying the classification number to each FPGA coupled with the CPU. Subsequently, each FPGA autonomously determines whether to receive the configuration entry. Thus, the process that the CPU configures the FPGA is simplified, and the occupation of the channel bandwidths between the CPU and the FPGAs is reduced, thereby increasing the efficiency of configuring, by the CPU, the FPGA.

On the other hand, when the CPU distributes one configuration entry to one type of FPGAs with the same classification number, only one configuration entry carrying the same classification number is generated. As a result, the process of performing configuration for the same type of FPGAs in a batch is simplified. Particularly, when a configuration frequency is high, the occupation of CPU resources may be further reduced, thereby increasing the performance of the entire system.

Figure 2:
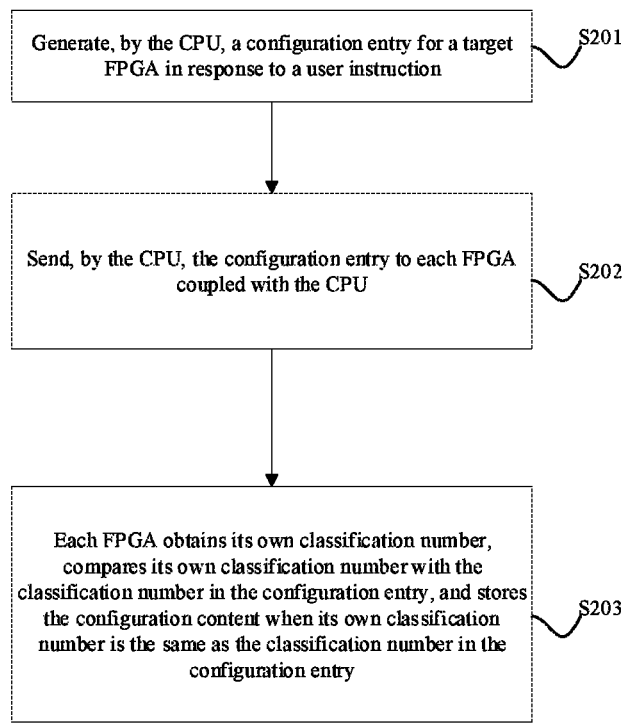
FIG. 2 is a flowchart illustrating a method of dynamically configuring a FPGA according to an example of the present disclosure.

FIG. 2 is a flowchart illustrating a method of dynamically configuring a FPGA according to an example of the present disclosure.

As shown in FIG. 2, the method may be applied to a network security device. The architecture of the network security device is shown in FIG. 1. The method may include the following steps 201-203.

At step S201, the CPU generates a configuration entry for a target FPGA in response to a user instruction. The configuration entry includes a classification number and a configuration content for the target FPGA.

At step S202, the CPU sends the configuration entry to each FPGA coupled with the CPU.

At step S203, each FPGA obtains its own classification number, compares its own classification number with the classification number in the configuration entry, and stores the configuration content when its own classification number is the same as the classification number in the configuration entry.

When the CPU distributes the configuration entry to each FPGA, a format of the configuration entry distributed by the CPU to each FPGA may be extended by introducing a field used to indicate a type of the classification number of the target FPGA in the existing format of the configuration entry. In this way, the target FPGA may autonomously determine whether to store the received configuration entry.

It is noted that the classification number of the FPGA may be obtained by performing classification based on different classification strategies. For example, the classification number corresponding to each FPGA may be obtained by performing classification based on the functionality of FPGA or according to a position of FPGA in the network security device. The classification numbers of FPGAs with the same functionality may be consistent. Thus, the field used to indicate the classification number of the target FPGA may also be of different types.

In an example, since FPGAs may be numbered in several manners. As a result, a classification identifier field may be extended in the format of the above configuration entry and used to indicate a type or class of the classification number of the target FPGA. For example, the classification identifier being 1 indicates that the classification number in the configuration entry is a classification number obtained according to the position of the FPGA in the network security device; and the classification identifier being 2 indicates the classification number in the configuration is a classification number obtained by performing classification based on the functionality of FPGA.

When the user needs to configure the target FPGA, in response to the configuration instruction edited by the user, the CPU may obtain the classification number of the target FPGA, and generate the configuration entry carrying the classification number for the target FPGA. The CPU distributes the generated configuration entry to each FPGA, so that each FPGA determines whether to receive the configuration entry based on a determination that the received classification number is consistent with its own classification number.

On one hand, when distributing the configuration entry to the target FPGA, the CPU does not perform addressing for the target FPGA based on the entry address in the configuration entry, but directly distributes the configuration entry carrying the classification number to each FPGA coupled with the CPU. Subsequently, each FPGA autonomously determines whether to receive the configuration entry. Thus, the process that the CPU configures the FPGA is simplified, and the occupation of the channel bandwidths between the CPU and the FPGAs is reduced, thereby increasing the efficiency of configuring, by the CPU, the FPGA.

On the other hand, when the CPU distributes one configuration entry to one type of FPGAs with the same classification number, only one configuration entry carrying the same classification number is generated. As a result, the process of performing configuration for the same type of FPGAs in a batch is simplified. Particularly, when a configuration frequency is high, the occupation of CPU resources may be further reduced, thereby increasing the performance of the entire system.

In an example, the network security device may include an architecture of master control board and service board.

Figure 3:
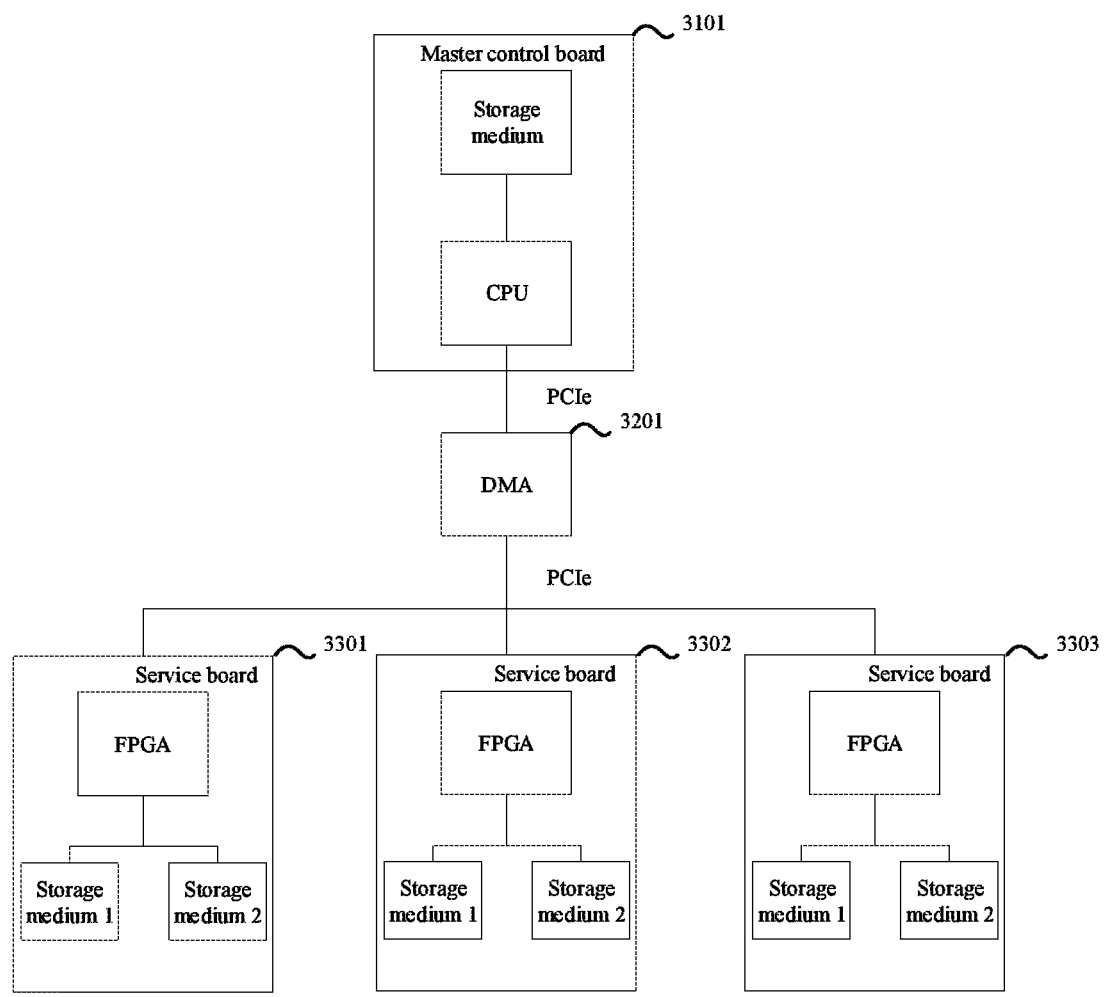
FIG. 3 is a schematic diagram illustrating an architecture of the network security device according to an example of the present disclosure.

FIG. 3 is an architecture diagram of a network security device according to an example of the present disclosure.

As shown in FIG. 3, in this architecture, a master control board 3101 is coupled with a service board 3301, a service board 3302 and a service board 3303. In an actual use, the master control board dynamically configures different service boards so that each service board implements a security service function.

It is noted that the architecture shown in FIG. 3 is illustrative. In an actual application, those skilled in the art may also adopt one architecture other than the architecture shown in FIG. 3 to implement the technical solution of the present disclosure. For example, CPU may be directly coupled with FPGA, and CPU and FPGA may both be located in the same circuit board. Further, the master control board may be of single core or multi-core. The same service board may also have a plurality of FPGAs. Other components included in the master control board and the service boards are also not shown in FIG. 3.

The examples of the present disclosure will be detailed in combination with the architecture of FIG. 3.

The user may firstly number the service boards. For example, the classification number of the service board 3301 is 3301 the classification number of the service board 3302 is 3302 and the classification number of the service board 3303 is 3303.

The present disclosure does not limit the manner of numbering the FPGAs. During implementation, in an example, FPGAs on the service boards may be directly numbered; in another example, the service boards where FPGAs are located may be numbered and then the number of the service board is taken as the number of FPGA.

In addition, the examples of the above classification number and the classification number of FPGA are used to better describe examples of the present disclosure. The actual number may be in the form of digits, letters, and symbols and so on. Further, each FPGA may correspond to a plurality of classification numbers. For example, the plurality of the classification numbers corresponding to the FPGA (service hoard) at least includes a classification number obtained by performing classification based on the functionality of FPGA (service board) and a classification number obtained according to the position of the FPGA (service board) in the network security device. The classification numbers of FPGAs (service boards) with the same functionality may be consistent.

When performing security service configuration for a target service board, for example, the service board 3302, a user may send a configuration instruction to the master control board 3101. It is noted that the user may directly or indirectly operate the master control board 3101 to send the configuration instruction. For example, the user directly touches the master control board 3101 to enable the master control board 3101 to obtain the configuration instruction or sends the configuration instruction to the master control board 3101 by an indirect operation such as voice. Of course, information contained in the configuration instruction is not limited herein as long as the master control board 3101 may complete configuration for the target service board. For example, the configuration instruction may include number information and functionality information of the target service board, or further include information enabling the master control board 3101 to obtain relevant information of the target service board.

At step S201, a CPU in the master control board 3101 generates a configuration entry for a target FPGA in a target service board in response to a user instruction. The configuration entry includes a classification number and a configuration content. The classification number is used to indicate a number of the target FPGA to be configured. In an example, the classification number in the configuration entry is 3302. The configuration content includes specific configuration information to dynamically configure the target FPGA by the CPU. The specific process of generating the configuration entry is well known by those skilled in the art and will not be detailed herein.

At step S202, the CPU in the master control board 3101 distributes the generated configuration entry to each FPGA.

It is noted that the CPU may distribute the configuration entry to each FPGA in a plurality of manners. For example, the CPU may directly send the configuration entry to each FPGA, or send the configuration entry to each FPGA through a storage medium coupled with the CPU. In an example, the CPU sends the configuration entry to each FPGA through the storage medium coupled with the CPU. Of course, the storage medium may refer to an internal memory or a hardware having storage function.

The CPU sends an instruction to the storage medium to perform step S202, so that the configuration entry configured for the target FPGA in the storage medium is distributed to all FPGAs in the service boards coupled with the master control board. Of course, the distribution may be performed in many manners. For example, as shown in FIG. 3, the CPU in the master control board 3101 is coupled with FPGAs in each service board through DMA (Direct Memory Access) 3201. The CPU stores the generated configuration entry in the storage medium coupled with the CPU. When the CPU needs to send the configuration entry to the FPGA, the CPU firstly sends a control instruction to the DMA 3201 so that the DMA 3201 distributes the configuration entry in the storage medium to each FPGA coupled with the CPU in response to the control instruction.

At step S203, after receiving the configuration entry from the CPU, each FPGA firstly obtains its own classification number, for example, the classification number 3301 of the FPGA in the service board 3301, the classification number 3302 of the FPGA in the service board 3302 and the classification number 3303 of the FPGA in the service board 3303. Each FPGA compares its own classification number with the classification number in the configuration entry. In an example, the configuration entry includes the classification number 3302. That is, only the classification number 3302 of the FPGA in the service board 3302 is the same as the classification number in the configuration entry. Thus, the FPGA in the service board 3302 may receive the configuration content in the configuration entry and be configured according to the specific configuration information in the configuration content. In this way, the user completes security service configuration for the FPGA in the service board 3302.

In an example, there may be a plurality of classification numbers corresponding to each FPGA and each classification number may be obtained based on different classification strategies. For example, the classification numbers corresponding to the FPGA (service board) at least includes a classification number obtained by performing classification based on the functionality of FPGA (service board) or a classification number obtained according to the position of the FPGA (service board) in the network security device. The classification numbers of FPGAs (service boards) with the same functionality may be consistent.

To distinguish the class or type corresponding to the classification number in the configuration entry generated by the CPU, the configuration entry generated by the CPU in the master control board 3101 further includes a classification identifier. Each FPGA obtains the classification number corresponding to the type indicated by the classification identifier from a plurality of classification numbers corresponding to the FPGA.

Figure 4:
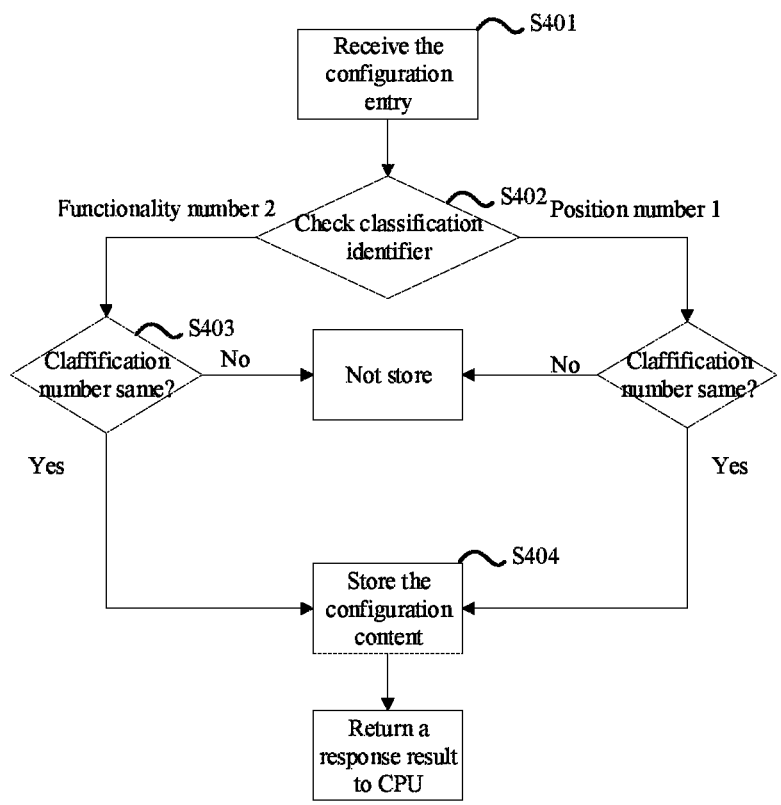
FIG. 4 flowchart of a method of dynamically configuring FPGA according to an example of the present disclosure.

For example, the classification number of the FPGA in the service board 3301 includes a position number 3301 and a functionality number A, the classification number of the FPGA in the service board 3302 includes a position number 3302 and a functionality number B, and the classification number of the FPGA in the service board 3303 includes a position number 3303 and a functionality number A. The FPGAs in the service boards 3301 and 3303 with the same functionality number A have the same functionality. The classification identifier being 1 indicates the type of the classification number in the configuration entry is a position number, and the classification identifier being 2 indicates the type of the classification number in the configuration entry is a functionality number. The detailed descriptions are made with an example in which a user configures security service function 1 for the FPGAs in the service boards 3301 and 3303 shown in FIG. 4. FIG. 4 is a flowchart of a method of dynamically configuring FPGA according to an example of the present disclosure.

The CPU in the master control board 3101 generates a configuration entry including the classification number A, the classification identifier 2 and a configuration content in response to a user instruction.

The CPU distributes the configuration entry to each FPGA in the service boards coupled with the master control board 3101.

At step S401, each FPGA receives the configuration entry.

At step S402, after receiving the configuration entry, each FPGA obtains the classification identifier 2 included in the configuration entry. Therefore, each FPGA obtains the functionality number from a plurality of classification numbers corresponding to the FPGA, that is, the FPGAs in the service boards 3301 and 3303 obtain the functionality number A and the FPGA in the service board 3302 obtains the functionality number B.

At step S403, each FPGA compares the obtained classification number with the classification number A included in the configuration entry.

At step S404, if the obtained classification number of the FPGA is the same as the classification number A included in the configuration entry, the FPGA stores the configuration content. In this example, the configuration entry includes the classification number A, that is, the function numbers of the FPGAs in the service boards 3301 and 3303 are the same as the classification number A included in the configuration entry. As a result, the FPGAs in the service boards 3301 and 3303 store the configuration content in the configuration entry and then are configured based on the specific configuration information included in the configuration content. In this way, the user completes configuration of security service function 1 for the FPGAs in the service boards 3301 and 3303.

It can be known from the above examples that when the CPU dynamically configures the FPGAs with the same functionality, only one configuration entry is generated. When the update frequency of the configuration entry is high, the number of the configuration entries generated by the CPU is greatly reduced, and the occupation of CPU resources is reduced, and the performance of the entire device system is improved.

It is noted that steps S203 and S404 both involves that the target FPGA stores the configuration content. The steps S203 and S404 may be performed in many manners which will not be specifically limited.

In an example, as shown in FIG. 3, the FPGA in the service board is coupled with a plurality of storage media. Different storage media correspond to different entry types. The configuration entry further includes an entry type and a storage address.

The FPGA in the service board determines a target storage medium corresponding to the entry type in the configuration entry from a plurality of coupled storage media based on the entry type in the configuration entry, and stores the configuration content in a storage space in the target storage medium and corresponding to the storage address in the configuration entry.

Different storage media may store different lengths of bytes at one time. The present disclosure further provides a technical solution to solve the technical problem that fails to continuously store the configuration content in the configuration entry.

In an example, the respective storage media coupled with each FPGA includes a plurality of continuous unit storage spaces.

Each FPGA determines whether a length of the configuration content in the configuration entry is greater than a storage length of the unit storage space. If yes, each FPGA allocates a plurality of continuous unit storage spaces for the configuration content and stores the configuration content in the plurality of continuous unit storage spaces.

For example, the unit storage space of the storage medium coupled with the FPGA is 16 bytes. When the FPGA receives a configuration content with a content length of 56 bytes, based on the above step, the FPGA needs to allocate four continuous unit storage spaces and store the configuration content in the four continuous unit storage spaces.

If the FPGA successfully stores the configuration content in the configuration entry generated by the CPU, it indicates that the user (the CPU) completes configuration for the target FPGA. However, in an actual configuration process, a case of unsuccessful configuration may exist. To visually prompt the user about whether the configuration is successful, the present disclosure provides the following examples. It is noted that other examples conceived of by those skilled in the all according to the present disclosure shall all fall within the scope of protection of the present disclosure.

Figure 5:
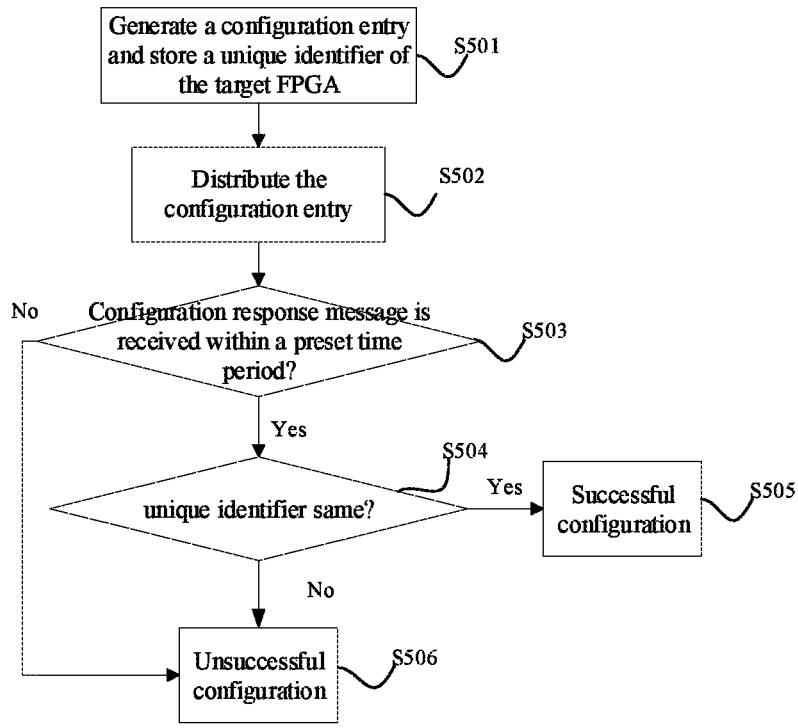
FIG. 5 is a flowchart of a method of determining whether configuration for the FPGA is successful according to an example of the present disclosure.

FIG. 5 is a flowchart of a method of determining whether configuration for the FPGA is successful according to an example of the present disclosure. In an example, as shown in FIG. 5, specific steps will be illustrated in combination with the architecture shown in FIG. 3.

For example, the user needs to configure security service function 1 for the FPGAs in the service boards 3301 and 3303. The specific configuration process is already detailed in the above examples and will not be repeated herein. Subsequently, detailed descriptions are made only to a part added to the above examples. It is noted that the execution subject of the following examples is the CPU in the master control board 3101.

At step S501, a configuration entry is generated for a target FPGA in response to a user instruction. A storage medium coupled with the CPU stores unique identifiers of the FPGAs in the service board 3301 and the service board 3303. It is noted that a unique identifier corresponding to the FPGA may be a factory number or other of the FPGA, which is not limited herein. The factory number corresponding to the FPGA is taken as the unique identifier below.

At step S02, the configuration entry is distributed to each FPGA in the service boards coupled with a master control board.

At step S503, it is determined whether a configuration response message returned by the FPGA which successfully stores the configuration content is received within a preset time length starting from sending the configuration entry. For example, the preset time length is 5 seconds. The above configuration response message includes the factory number of the FPGA successfully storing the configuration content.

At step S504, if the configuration response message is received, it is further determined whether the factory number of the target FPGA stored in the storage medium coupled with the CPU is consistent with the factory number of the FPGA in the configuration response message.

At step S505, if the factory number of the target FPGA stored in the storage medium coupled with the CPU is consistent with the factory number of the FPGA in the configuration response message, a prompt message to prompt successful configuration of the target FPGA is generated and returned to the user.

At step S506, if the factory number of the target FPGA stored in the storage medium is inconsistent with the factory number of the target FPGA in the configuration response message, a prompt message to prompt unsuccessful configuration of the target FPGA is generated and returned to the user.

In the example, the storage medium coupled with the CPU stores the factory numbers of the FPGAs in the service boards 3301 and 3303. The FPGA which successfully stores the configuration content returns the configuration response message including the factory number of the FPGA. If the FPGA which successfully stores the configuration content is only the FPGA in the service board 3301, the CPU in the master control board 3101 only receives the factory number of the FPGA in the service board 3301. At steps S504 and S505, the factory number of the FPGA in the service board 3301 is successfully matched and the factory number of the FPGA in the service board 3303 is unsuccessfully matched. Thus, the CPU in the master control board 3101 may generate a prompt message to prompt successful configuration of the FPGA in the service board 3301 and unsuccessful configuration of the FPGA in the service board 3303, and return the prompt messages to the user.

If it is determined that the configuration response message returned by the FPGA which successfully stores the configuration content is not received within the preset time length during performing the step S503, the step S506 is directly performed to generate a prompt message to prompt unsuccessfully configuration of the target FPGA and return the prompt message to the user.

For example, within five seconds starting from sending the configuration entry by the CPU in the master control board 3101, the CPU only receives the configuration response message including the factory number of the FPGA in the service board 3303 and returned by the FPGA in the service board 3303 and does not receive the configuration response message returned by the FPGA in the service board 3301. Thus, step S506 is performed to generate a prompt message of the successful configuration of the FPGA in the service board 3303 and the unsuccessful configuration of the FPGA in the service board 3301 and return the prompt message to the user. The generation of the prompt message of the successful configuration of the FPGA in the service board 3303 is not detailed herein.

It is noted that the user may perform other operations based on the prompt message after receiving the prompt message. For example, the unsuccessfully-configured FPGA in the service board is re-configured. For another example, the user may find the unsuccessfully-configured FPGA in service board based on the prompt message and find the cause of unsuccessfully storing the configuration content. It should be understood that the other operations are not specified and thus may be any operation conceived of by those skilled in the art based on the example.

It is noted that the above examples are merely used to better describe the solution of present disclosure. Other solutions conceived of by those skilled in the art shall fall within the scope of protection of the present disclosure.

Corresponding to the examples of the above method, the present disclosure further provides a network security device.

The architecture of the network security device is as shown in FIG. 3. It is noted that the architecture shown in the FIG. 3 is merely illustrative rather than represent the unique architecture of the network security device, Any architecture that is similar to the architecture illustrated herein and conceived of by those skilled in the art shall fall within the scope of the protection of the present disclosure.

The network security device includes a master control board 3101 including a CPU and a storage medium coupled with the CPU. The network security device further includes a DMA 3201. The CPU in the master control board 3101 is coupled with a FPGA in each service board through the DMA 3201. The DMA 3201 distributes the configuration entry from the storage medium to each FPGA coupled with the CPU in response to a control instruction sent by the CPU.

The connection between the CPU and the DMA 3201 and the connection between the DMA 3201 and the FPGA are both connection of high speed serial bus PCIe (PCI-Express).

The network security device further includes a service board 3301, a service board 3302 and a service board 3303. It is noted that the number of the service boards are used only for better illustration, that is, the number of the service boards is not limited. There may be more service boards. The service board may include a FPGA and a plurality of memories coupled with the FPGA. The number of FPGAs in each service board is also not limited in the present disclosure.

The CPU in the master control board 3101 generates a configuration entry for a target FPGA in a target service board in response to a user instruction and stores the configuration entry in the storage medium coupled with the CPU. The configuration entry includes a classification identifier, a classification number and a configuration content.

The CPU in the master control board 3101 stores a unique identifier of the target FPGA in the target service board in the storage medium coupled with the CPU.

The DMA 3201 sends the configuration entry to the service board 3301, the service board 3302 and the service board 3303 in response to the CPU instruction.

After obtaining the configuration entry, the FPGA in each service board may check the classification identifier in the configuration entry and determine a type of the classification number in the configuration entry based on the classification identifier.

It is noted that the FPGA in each service board is pre-numbered based on different classification strategy. The classification strategy is not limited in the present disclosure. An example of the classification strategy will be given below for better describing the examples. For example, a functionality number of the FPGA may be obtained by performing classification based on the functionality of the FPGA and/or a position number of the FPGA is obtained by performing classification based on the position of the FPGA.

For each FPGA, if the FPGA determines the classification identifier indicates a functionality type, the FPGA obtains a classification number corresponding to the functionality type from a plurality of classification numbers corresponding to the FPGA, and compares the obtained classification number of the FPGA with the classification number in the configuration entry. If the obtained classification number of the FPGA is inconsistent with the classification number in the configuration entry, the FPGA denies storing the configuration content in the configuration entry. If the obtained classification number of the FPGA is consistent with the classification number in the configuration entry, the FPGA stores the configuration content in the configuration entry.

For each FPGA, if the FPGA determines the classification identifier indicates a position type, the FPGA obtains a classification number corresponding to the position type from a plurality of classification numbers corresponding to the FPGA, and compares the obtained classification number of the FPGA with the classification number in the configuration entry. If the obtained classification number of the FPGA is inconsistent with the classification number in the configuration entry, the FPGA denies storing the configuration content in the configuration entry. If the obtained classification number of the FPGA is consistent with the classification number in the configuration entry, the FPGA stores the configuration content in the configuration entry.

Further, the FPGA stores the configuration content in the following process.

The configuration entry includes an entry type and a storage address. Different memories correspond to different entry types.

The FPGA determines a target storage medium corresponding to the entry type in the configuration entry from a plurality of storage media coupled with the FPGA according to the entry type of the configuration entry, and stores the configuration content in a storage space that is in the target storage medium and corresponds to the storage address in the configuration entry.

Further, the storage medium coupled with each successfully-matched FPGA includes a plurality of continuous unit storage spaces.

When the classification number of the FPGA is the same as the classification number in the configuration entry, the FPGA determines whether the length of the configuration content in the configuration entry is greater than the storage length of the unit storage space. If yes, the FPGA allocates a plurality of continuous unit storage spaces for the configuration content and stores the configuration content in the plurality of continuous unit storage spaces.

Further, the CPU in the master control board 3101 determines whether a configuration response message returned by the FPGA successfully storing the configuration content is received. The configuration response message includes a unique identifier of the FPGA successfully storing the configuration content.

If the configuration response message returned by the FPGA successfully storing the configuration content is received, it is further determined whether the unique identifier of the target FPGA stored in the storage medium coupled with the CPU is consistent with the unique identifier of the FPGA successfully storing the configuration content in the configuration response message. If yes, a prompt message of successfully configuring the target FPGA is generated and then returned to the user.

If the configuration response message returned by the FPGA successfully storing the configuration content is not received within a preset time length, a prompt message of unsuccessfully configuring the target FPGA is generated and then returned to the user.

It is noted that the user may perform other operations based on the prompt message after receiving the prompt message. For example, the unsuccessfully configured. FPGA unsuccessfully configured is re-configured. For another example, the user may find the service board corresponding to the unsuccessfully-configured FPGA based on the prompt message and seek the cause of unsuccessfully storing the configuration content. It should be understood that the other operations are not specified and thus may be any operation conceived of by those skilled in the art based on the example.

It can be known from the above examples that the CPU adds the classification number in the generated configuration entry and distributes the configuration entry to each FPGA so that each FPGA may compare its own classification number with the classification number in the configuration entry. When a classification number of a FPGA is the same as the classification number in the configuration entry, the FPGA receives the configuration entry, thereby realizing configuration of the target FPGA.

On one hand, when distributing the configuration entry to the target FPGA, the CPU does not perform addressing for the target FPGA based on the entry address in the configuration entry, but directly distributes the configuration entry carrying the classification number to each FPGA coupled with the CPU. Subsequently, each FPGA autonomously determines whether to receive the configuration entry. Thus, the process that the CPU configures the FPGA is simplified, and the occupation of the channel bandwidths between the CPU and the FPGAs is reduced, thereby increasing the efficiency of configuring, by the CPU, the FPGA.

On the other hand, when the CPU distributes one configuration entry to one type of FPGAs with the same classification number, only one configuration entry carrying the same classification number is generated. As a result, the process of performing configuration for the same type of FPGAs in a batch is simplified. Particularly, when a configuration frequency is high, the occupation of CPU resources may be further reduced, thereby increasing the performance of the entire system.

Further, in the examples of the present disclosure, for a FPGA whose classification number is the same as the classification number in the configuration entry, the FPGA performs continuous storage for a configuration content greater than its own one-time storage length. In this way, it is avoided that the CPU sends the configuration entry to the FPGA many times due to limitation of one-time storage length of the FPGA. Thus, occupation of channel bandwidths between the CPU and FPGAs due to the configuration entry is reduced.

In another example of the present disclosure, the CPU may monitor an actual configuration result. A target FPGA that is not successfully configured is found and recorded by comparing the actual configuration result and a desired configuration result, so that the target FPGA that is not successfully configured is notified to the user for other uses.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

What is claimed is:

1. A method of dynamically configuring a Field Programmable Gate Array (FPGA), the method applicable to a network security device, wherein the network security device comprises a Central Processing Unit (CPU) and at least one FPGA coupled with the CPU, and the method comprises:
   in response to a user instruction, generating, by the CPU, a configuration entry for a target FPGA, wherein the configuration entry comprises a first classification number, a classification identifier and a configuration content for the target FPGA, and the classification identifier indicates a type corresponding to the first classification number in the configuration entry;
   sending, by the CPU, the configuration entry to each of the at least one FPGA coupled with the CPU; and
   for each of the at least one FPGA,
      obtaining, by the FPGA, a second classification number corresponding to the type indicated by the classification identifier from a plurality of second classification numbers of the FPGA,
      comparing, by the FPGA, the second classification number of the FPGA with the first classification number in the configuration entry, and
      storing, by the FPGA, the configuration content when the second classification number of the FPGA is the same as the first classification number in the configuration entry, so as to dynamically configure the FPGA,
   wherein each of the at least one FPGA is coupled with a plurality of storage media, different storage media correspond to different entry types.

2. The method according to claim 1, wherein the plurality of second classification numbers of the FPGA comprises a functionality number obtained by performing classification on a functionality of the FPGA and a position number obtained by performing classification on a position of the FPGA.

3. The method according to claim 1, wherein the CPU is coupled with each of the at least one FPGA through a Direct Memory Access (DMA) in the network security device;
   wherein sending the configuration entry to each of the at least one FPGA coupled with the CPU comprises:
   storing, by the CPU, the generated configuration entry in a storage medium coupled with the CPU, and
   distributing, by the CPU, a control instruction to the DMA so that the DMA distributes the configuration entry in the storage medium to each of the at least one FPGA coupled with the CPU in response to the control instruction.

4. The method according to claim 1, wherein the configuration entry further comprises an entry type and a storage address;
   storing the configuration content comprises:
   determining, by the FPGA, a target storage medium corresponding to the entry type in the configuration entry from a plurality of storage media coupled with the FPGA;
   storing, by the FPGA, the configuration content in a storage space in the target storage medium and corresponding to the storage address in the configuration entry.

5. The method according to claim 4, wherein the target storage medium coupled with the FPGA comprises a plurality of continuous unit storage spaces;
   storing the configuration content in the storage space in the target storage medium and corresponding to the storage address in the configuration entry comprises:
   determining, by the FPGA, whether a length of the configuration content in the configuration entry is greater than a storage length of the unit storage space;
   if the length of the configuration content in the configuration entry is greater than the storage length of the unit storage space,
      allocating, by the FPGA, multiple continuous unit storage spaces in the plurality of continuous unit storage spaces to the configuration content; and
      storing, by the FPGA, the configuration content in the multiple continuous unit storage spaces.

6. The method according to claim 1, wherein the network security device comprises a master control board and at least one service board;
   the master control board comprises:
      the CPU; and
      a storage medium coupled with the CPU;
   each of the service board comprises:
      a FPGA; and
      a plurality storage media coupled with the FPGA.

7. The method according to claim 1, wherein before sending the configuration entry to each of the at least one FPGA coupled with the CPU, the method further comprises:
   storing, by the CPU, a unique identifier of the target FPGA in the storage medium coupled with the CPU.

8. The method according to claim 7, further comprising:
   determining, by the CPU, whether a configuration response message returned by the FPGA successfully storing the configuration content is received, wherein the configuration response message comprises a unique identifier of the FPGA successfully storing the configuration content;
   if the configuration response message returned by the FPGA successfully storing the configuration content is received, determining, by the CPU, whether the unique identifier of the target FPGA stored in the storage medium coupled with the CPU is consistent with the unique identifier of the FPGA successfully storing the configuration content in the configuration response message;
   if the unique identifier of the target FPGA stored in the storage medium coupled with the CPU is consistent with the unique identifier of the FPGA successfully storing the configuration content in the configuration response message,
      generating, by the CPU, a prompt message of successfully configuring the target FPGA, and
      returning, by the CPU, the prompt message to the user.

9. The method according to claim 8, further comprising:
if the configuration response message returned by the FPGA successfully storing the configuration content is not received within a preset time length,
generating, by the CPU, a prompt message of unsuccessfully configuring the target FPGA; and
returning, by the CPU, the prompt message to the user.

10. A network security device, comprising:
a CPU; and
at least one FPGA coupled with the CPU;
wherein the CPU is configured to:
in response to a user instruction, generate a configuration entry for a target FPGA, wherein the configuration entry comprises a first classification number, a classification identifier and a configuration content for the target FPGA, and the classification identifier indicates a type corresponding to the first classification number in the configuration entry, and
send the configuration entry to each of the at least one FPGA coupled with the CPU;
for each of the at least one FPGA coupled with the CPU, the FPGA is configured to:
obtain a second classification number corresponding to the type indicated by the classification identifier from a plurality of second classification numbers of the FPGA,
compare the second classification number of the FPGA with the first classification number in the configuration entry, and
store the configuration content when the second classification number of the FPGA is the same as the first classification number in the configuration entry, so as to dynamically configure the FPGA, and
wherein each of the at least one FPGA is coupled with a plurality of storage media, different storage media correspond to different entry types.

11. The network security device according to claim 10, wherein the plurality of second classification numbers of the FPGA comprises a functionality number obtained by performing classification on a functionality of the FPGA and a position number obtained by performing classification on a position of the FPGA.

12. The network security device according to claim 10, further comprising:
a DMA, wherein the CPU is coupled with each of the at least one FPGA through the DMA;
wherein the CPU is further configured to store the generated configuration entry in a storage medium coupled with the CPU and distribute a control instruction to the DMA;
the DMA is configured to distribute the configuration entry in the storage medium to each of the at least one FPGA coupled with the CPU in response to the control instruction.

13. The network security device according to claim 10, wherein the configuration entry further comprises an entry type and a storage address;
when the second classification number of the FPGA is the same as the first classification number in the configuration entry, the FPGA is further configured to:
determine a target storage medium corresponding to the entry type in the configuration entry from a plurality of storage media coupled with the FPGA;
store the configuration content in a storage space in the target storage medium and corresponding to the storage address in the configuration entry.

14. The network security device according to claim 13, wherein the target storage medium coupled with the FPGA comprises a plurality of continuous unit storage spaces;
the FPGA is further configured to:
determine whether a length of the configuration content in the configuration entry is greater than a storage length of the unit storage space;
when the length of the configuration content in the configuration entry is greater than the storage length of the unit storage space,
allocate multiple continuous unit storage spaces in the plurality of continuous unit storage spaces to the configuration content; and
store the configuration content in the multiple continuous unit storage spaces.

15. The network security device according to claim 10, comprising a master control board and at least one service board;
the master control board comprises:
the CPU; and
a storage medium coupled with the CPU;
each of the service board comprises:
a FPGA; and
a plurality storage media coupled with the FPGA.

16. The network security device according to claim 10, wherein the CPU is further configured to:
store a unique identifier of the target FPGA in the storage medium coupled with the CPU before sending the configuration entry to each of the at least one FPGA coupled with the CPU.

17. The network security device according to claim 16, wherein the CPU is further configured to:
determine whether a configuration response message returned by the FPGA successfully storing the configuration content is received, wherein the configuration response message comprises a unique identifier of the FPGA successfully storing the configuration content;
if the configuration response message returned by the FPGA successfully storing the configuration content is received, determine whether the unique identifier of the target FPGA stored in the storage medium coupled with the CPU is consistent with the unique identifier of the FPGA successfully storing the configuration content in the configuration response message;
if the unique identifier of the target FPGA stored in the storage medium coupled with the CPU is consistent with the unique identifier of the FPGA successfully storing the configuration content in the configuration response message,
generate a prompt message of successfully configuring the target FPGA, and
return the prompt message to the user.

18. The network security device according to claim 17, wherein the CPU is further configured to:
if the configuration response message returned by the FPGA successfully storing the configuration content is not received within a preset time length,
generate a prompt message of unsuccessfully configuring the target FPGA; and
return the prompt message to the user.

* * * * *